(12) United States Patent
Haug et al.

(10) Patent No.: US 6,271,162 B1
(45) Date of Patent: Aug. 7, 2001

(54) METHOD FOR PRODUCING CERAMIC-METAL COMPOSITE BODIES, CERAMIC-METAL COMPOSITE BODIES AND THEIR USE

(75) Inventors: Tilmann Haug, Uhldingen-Muehlhofen; Steffen Rauscher, Ulm; Michael Schleydecker, Nersingen; Karl Weisskopf, Rudersberg, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/367,720
(22) PCT Filed: Feb. 9, 1998
(86) PCT No.: PCT/EP98/00681
§ 371 Date: Oct. 27, 1999
§ 102(e) Date: Oct. 27, 1999
(87) PCT Pub. No.: WO98/37034
PCT Pub. Date: Aug. 27, 1998

(30) Foreign Application Priority Data
Feb. 20, 1997 (DE) .............................. 197 06 926

(51) Int. Cl.⁷ .......................... C04B 35/58; C04B 35/56; C04B 35/65; C04B 41/88; F16D 69/02
(52) U.S. Cl. .......................... 501/87; 501/96.1; 501/96.3; 501/127; 188/218 XL; 188/251 A; 188/251 M; 428/307.7; 428/319.1; 428/325; 428/539.5; 75/235; 75/236; 75/244; 75/245; 75/249; 427/383.3
(58) Field of Search ........................... 501/87, 96.1, 96.3, 501/127; 188/218 XL, 251 A, 251 M; 428/307.7, 319.1, 325, 539.5; 75/235, 236, 244, 245, 249; 427/383.3

(56) References Cited

U.S. PATENT DOCUMENTS

| 4,033,400 | 7/1977 | Gurwell et al. | 164/98 |
| 4,585,618 | 4/1986 | Fresnel et al. | 419/12 |
| 4,988,645 | 1/1991 | Holt et al. | 501/91 |
| 5,535,857 | 7/1996 | Barlow | 188/218 XL |
| 6,025,065 * | 2/2000 | Claussen et al. | 501/97.2 |

FOREIGN PATENT DOCUMENTS

| 0 116 809 | 8/1984 | (EP) . |
| 0 253 497 | 1/1988 | (EP) . |
| 0 368 784 | 9/1989 | (EP) . |
| 0 368 785 | 9/1989 | (EP) . |

\* cited by examiner

*Primary Examiner*—Karl Group
(74) *Attorney, Agent, or Firm*—Crowell & Moring, L.L.P.

(57) ABSTRACT

A process for producing a ceramic-metal composite, includes (1) mixing $TiO_2$, and optionally Ti, with at least one of a boron-containing or carbon-containing material to give a green body mix; (2) heat treating the green body mix to a temperature from 900° C. to 1900° C. and below a temperature which leads to an autocatalytic reaction; (3) carrying out an exchange reaction between the material and the $TiO_2$ to give a reaction product comprising at least one of $TiB_x$ and $TiC_y$, wherein $0 \leq x \leq 2$ and $0 \leq y \leq 1$; (4) producing a porous green body from the reaction product; (5) filling the porous green body with liquid aluminum after the exchange reaction; and (6) carrying out a reaction between the reaction product in the green body and the aluminum to form the ceramic-metal composite comprising a ceramic phase selected from the group consisting of $TiB_x$-, $TiC_y$-, TiCN- and $Al_2O_3$ and a comprising a metallic phase comprising an intermetallic compound of Ti and Al.

26 Claims, No Drawings

METHOD FOR PRODUCING CERAMIC-METAL COMPOSITE BODIES, CERAMIC-METAL COMPOSITE BODIES AND THEIR USE

BACKGROUND AND SUMMARY OF INVENTION

The invention relates to a process for producing ceramic-metal composites, ceramic-metal composites and their use.

Conventional brake discs are generally made of grey cast iron. A tried and tested technology exists for this, resulting in a low cost level in mass production. However, problems increasingly occur in modern vehicles, since ever greater masses have to be braked at rising maximum speeds. This situation considerably increases the structural complication of the brake systems (e.g. internal ventilation), since heating of the brake disc to above a critical temperature has to be prevented. An increase in the size of braking systems also increases their mass, which has an adverse effect on handling.

A further group of materials already in use for brake applications are the MMCs (metal matrix composites). These are generally particle-reinforced aluminium, with the reinforcing phase usually consisting of a ceramic such as SiC or $Al_2O_3$. For this class of materials, a low density is a key property, which enables components having a low weight to be realized. However, this material reaches its thermal limits at about 450° C., since the aluminium base material very quickly softens and loses its mechanical strength.

The lowest density of all potential brake materials is displayed by the carbon fibre-reinforced carbons (C/C). These materials have already been used successfully for some time in racing. Their disadvantage is primarily their high wear which would make them uneconomical for production vehicles. In addition, C/Cs have a low thermal conductivity and heat capacity which leads to them heating up to a high temperature during braking.

Infiltration of C/C materials with silicon gives a ceramic SiC material which is reinforced by carbon fibres. This is likewise an interesting brake material, but in its present form it has a low coefficient of friction and, like all fibre-reinforced materials, is still very expensive.

Processes for producing ceramic-metal composites by infiltration of porous ceramic bodies have already been described in a number of patent documents.

U.S. Pat. No. 5,535,857 claims the production of a ceramic-metal brake disc by infiltration of a porous SiC precursor body. For this ceramic body, the SiC powder is pressed into the required shape and presintered, so that open pore channels remain. The porous disc is then infiltrated with an aluminium alloy, forming a metal-reinforced ceramic matrix. The metal undergoes no reaction with the matrix during infiltration, so that the heat resistance of the material depends on the reinforcing matrix. In the case of infiltration with aluminium, this means that the use limit of the material is 400° C.

In a further process, the infiltration of a ceramic precursor body with aluminium has likewise been described (U.S. Pat. No. 4,988,645). Here, the ceramic body is produced by means of an SHS reaction (SHS=self-propagating high-temperature synthesis, in which a reactive mixture is ignited and undergoes a self-propagating reaction to give the desired ceramic matrix as reaction product).

U.S. Pat. No. 4,033,400 claims the infiltration of a porous ceramic body with a liquid metal, where the matrix comprises $Si_3N_4$ and the metal is an aluminium alloy. Here too, it is clearly stated as important that no reaction should take place between the matrix and the metal.

Lanxide Technology likewise claims a series of materials which have been produced by metal infiltration (e.g. EP-B-0 368 785, EP-B-0 368 784). These patents essentially claim new process steps such as the targeted oxidation of the ceramic precursor body.

In all patents hitherto, no reaction infiltration took place. A single exception is the patent U.S. Pat. No. 4,585,618 which discloses the only process in which the infiltrated metal (aluminium) undergoes a reaction with the matrix. The aim of this invention is to produce a reinforced $TiB_2/Al_2O_3$ ceramic for electrolysis cells. For this purpose, a $TiO_2/B_2O_3/Al$ mixture is infiltrated with aluminium. The infiltration time is 100 hours! The reaction product comprises $TiB_2/Al_2O_3/Al$, with $Al_3Ti$ also being detected on the surface, although this is not desired.

At this point, reference is made to the patent application DE-P 197 06 925 Al entitled "Process for producing ceramic-metal composites, ceramic-metal composites and their use" submitted by the applicant and having the same priority as the present patent application.

The process described here differs from the existing processes primarily in that the infiltration with aluminium results in a reaction which produces a high-temperature-resistant aluminium alloy. In addition to the reaction infiltration, the ceramic precursor body is also produced by a reaction synthesis, by which means the future material composition can be controlled in terms of its functional constituents.

The material of the present invention has a density of 3.4 $g/cm^3$, which is slightly higher than the density of the MMCs, but only 42% of the density of cast iron. As a result of the high-temperature-resistant phases of TiAl, its use range should extend up to 800° C.; it should thus significantly exceed the values for grey cast iron.

A further important advantage of this material is the low costs both of the raw materials and of the process technology. The material and the process have the potential to give a price per item in the vicinity of that of cast iron discs in mass production.

The process of the invention is described in detail below.

DETAILED DESCRIPTION OF THE INVENTION

The reactive starting materials are weighed in powder form in the previously calculated stoichiometric ratios and roughly mixed in a glass flask. Subsequently a binder (propylene carbonate) dissolved in acetone is added to the powder mixture. This slip is thoroughly mixed on a rotary evaporator and at the same time dried. The dried material comprises large, hard agglomerates which have to be comminuted in a centrifugal mill. The powder obtained in this way is uniaxially pressed in a round die (die diameter 60 mm, 100 mm, 330 mm).

The decisive process step is the heat treatment of this ceramic matrix. The heat treatment is carried out in a range from 1100° C. to 1400° C. using a temperature programme whose ramps and hold times are appropriate to the reaction mechanisms. For heating, it is usual to use a graphite-heated cold-wall reactor under reduced pressure.

The porous ceramic precursor bodies obtained in this way are subsequently, in the same unit, infiltrated with liquid aluminium at 1100° C. under reduced pressure in an aluminium oxide crucible. The infiltration is self-propagating and dependent on the wetting of the ceramic matrix by the melt. This in turn determines a temperature and time window for the infiltration step.

The process steps are therefore as follows:

Weighing out of powder

Addition of binder and wet mixing

Drying and milling (e.g. in a centrifugal mill)

Uniaxial pressing

Heat treatment of matrix

Metal infiltration

Final machining.

In the production of the ceramic-metal composite, two reactions proceed in separate process steps. These are a solid-solid reaction in the first step and a solid-liquid reaction in the second step. The reactions employed here are referred to as exchange reactions and correspond to the chemical concept of the redox reaction. Here, a ceramic compound reacts with a metal to form a new ceramic compound and a different metal is liberated. An example is the reaction of aluminium with titanium dioxide which is as follows:

$$4Al+3TiO_2 \rightarrow Ti+2Al_2O_3$$

The particular advantage of this example is that a low-melting, inexpensive metal (aluminium) is reacted to form a high-melting, expensive metal (Ti). The situation is similar in respect of the ceramic constituents, where a low-value substance is also converted into a higher-value substance.

In addition to the ceramic-metal composite being used as a brake disc, this composite can be a part of a gas turbine or engine, for example, a sliding bearing; a cutting tool; or bullet-proof armor.

Before going into the precise details of the reaction procedure, it will be depicted schematically so as to provide an overview.

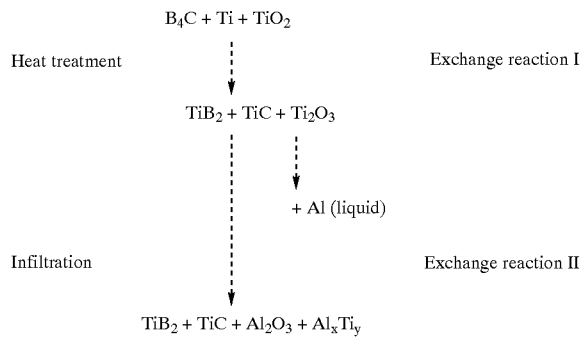

a) Exchange Reaction I:

The first reaction step is the above-described heat treatment of the matrix. The pressed, green ceramic body, which comprises a stoichiometric mixture of $B_4C/3$ Ti and 2 $TiO_2$, is subjected to a heat treatment in which the following reaction essentially takes place:

$$B_4C+3Ti+2TiO_2 \rightarrow 2TiB_2+TiC+Ti_2O_3+0.5O_2$$

Thus, an exchange reaction between $B_4C$ and Ti takes place so as to give $TiB_2$ and TiC as reaction products. Although the $TiO_2$ is reduced to a lower oxidation state, it does not influence the abovementioned reaction, which is why its behaviour can be described as pseudo-inert.

The exchange reaction between $B_4C$ and Ti plays a central role in this process and has been selected since the reaction products $TiB_2$ and TiC promise good tribological properties. In the process of the present invention, it has been possible to allow the reaction to proceed in a controlled fashion by means of a refined temperature programme.

In this process step, it is possible to manipulate the composition and properties of the future composite. In the exchange reaction $B_4C/Ti$, a pronounced negative volume change occurs. This means that the porosity which the pressed body already has increases considerably; after the heat treatment of the matrix it is usually in the range from 40% to 55%. It is of great importance to set the porosity in this process stage precisely, since in the later reaction infiltration the porosity determines the amount of Al to be reacted and thus the final phase composition.

In order to set a particular porosity, one method is to vary the green body composition and another is to exert an influence on the reaction by means of a suitable temperature programme.

Variation of the green body composition will be described in more detail, since it is possible here to add all or some of the products of the exchange reaction $B_4C/Ti$, i.e. $TiB_2$ and (or) TiC to the green body at the beginning. The starting mixtures used up to now have the following stoichiometries:

0.5 $B_4C/1.5$ Ti/$TiB_2/0.5$ TiC/2 $TiO_2$

2 $TiB_2/TiC/2$ $TiO_2$

3 TiC/0.7 N/0.3 2 $TiO_2$

After the first reaction step, the ceramic precursor body has almost the same composition, only the porosity has changed. Using this method, it is possible to determine the functional ceramic constituents precisely and thus to set particular material properties, for example the coefficient of friction.

b) Exchange Reaction II (reaction infiltration):

The second exchange reaction is carried out in the form of a reaction infiltration. Here, the porous ceramic body is placed in an aluminium powder bath and heated under reduced pressure to a temperature of over 1000° C. The aluminium melts and is absorbed by the ceramic body at a particular temperature. During this infiltration process, a reaction between Al and $Ti_2O_3$ occurs; depending on composition, this reaction approximately obeys the following equation:

$$4Al+Ti_2O_3 \rightarrow 2AlTi+Al_2O_3$$

During this reaction, the ceramic constituents $TiB_2$ and TiC, which represent the functional groups in the finished material, remain inert. The Al and the $Ti_2O_3$ react in such a way that the final shaped body is virtually nonporous.

EXAMPLES

Example 1

A powder mixture having the stoichiometric composition $B_4C/3$ Ti/2 $TiO_2$ is admixed with a binder (polypropylene carbonate) and uniaxially pressed to form a round disc. This disc is subsequently heat treated in the temperature range from 1200° C. to 1400° C. under reduced pressure in a graphite-heated cold-wall reactor for 30 minutes. The ceramic body formed in this way has the stoichiometric composition 2 $TiB_2/TiC/Ti_2O_3$ and has a porosity of 55%. The infiltration with pulverulent Al is carried out in the same furnace at 1100° C., likewise under reduced pressure, for 1.5 hours. The resulting metal-ceramic composite comprises about 20% by volume of $TiB_2$, 10% of TiC, 15% of $Al_2O_3$, 45% of $Al_3Ti$ and 10% of Al.

Example 2

A powder mixture having the stoichiometric composition 2 $TiB_2$/TiC/2 $TiO_2$ is processed and heat treated under the same conditions as in Example 1. The ceramic precursor body likewise has the same composition as in Example 1, but has a porosity of 45%. After infiltration with aluminium, the composite has a metal content of about 52% of $Al_3Ti$ and 3% of Al, with the ceramic constituents remaining as in Example 1.

Example 3

A powder mixture of $TiO_2$/C is heat treated at 1800° C. under a low partial pressure of $N_2$ (<1 mbar), forming a powder of the compound $TiC_xN_y$ (x,y depending on the partial pressure of $N_2$). The powder is mixed with $TiO_2$ in a ratio of 3:2 and processed as in Example 1. The resulting material has only $TiC_xN_y$ and Al in the ceramic phase while the metallic phase is identical to that in Example 1.

The motivation for the present invention was the development of a new brake material. The properties of this material at the same time make it eminently suitable for use in all areas where high temperature and high wear occur.

What is claimed is:

1. A process for producing a ceramic-metal composite, comprising:
   mixing $TiO_2$, and optionally Ti, with starting materials selected from the group consisting of a boron-containing material, a carbon-containing material, and combinations thereof to give a green body mix;
   heat-treating the green body mix at a temperature from 900° C. to 1900° C. and below a temperature that leads to an autocatalytic reaction;
   carrying out an exchange reaction between the starting materials where the $TiO_2$ can be involved to give a reaction product comprising at least one of $TiB_x$ and $TiC_y$, wherein $0<x\leq2$ and $0<y\leq1$;
   producing a shape-stable porous green body from the reaction product;
   filling the porous green body with liquid aluminum after the exchange reaction; and
   reacting the reaction product in the green body and the aluminum to form the ceramic-metal composite comprising:
   a ceramic phase selected from the group consisting of $TiB_x$, $TiC_y$, TiCN and $Al_2O_3$ and
   a metallic phase comprising an intermetallic compound of Ti and Al.

2. A process according to claim 1, wherein the starting material is a boride ceramic or a carbide ceramic.

3. A process according to claim 1, wherein the heat-treating is at a temperature from 1100° C. to 1400° C.

4. A process according to claim 1, wherein the autocatalytic reaction is an explosion.

5. A process for producing a ceramic-metal composite, comprising:
   mixing $TiO_2$ and, optionally Ti, with starting materials selected from the group consisting of a boron-containing material, a carbon-containing material, and combinations thereof to give a green body mix;
   producing a shape-stable porous green body from the green body mix;
   heat-treating the porous green body at a temperature from 900° C. to 1900° C. and below a temperature which leads to an autocatalytic reaction;
   carrying out an exchange reaction between the starting materials where the $TiO_2$ can be involved to give a reaction product comprising at least one of $TiB_x$ and $TiC_y$, wherein $0<x\leq2$ and $0<y\leq1$;
   filling the porous green body with liquid aluminum after the exchange reaction; and
   reacting the reaction product in the green body and the aluminum to form the ceramic-metal composite comprising:
   a ceramic phase selected from the group consisting of $TiB_x$, $TiC_y$, TiCN and $Al_2O_3$ and
   a metallic phase comprising an intermetallic compound of Ti and Al.

6. A process according to claim 1, wherein the green body mix comprises a stoichiometric or excess of oxygen.

7. A process according to claim 1, wherein the green body mix comprises an excess of carbon.

8. A process according to claim 1, wherein said filling comprises pressing the liquid aluminum into the green body at a temperature below 1000° C.

9. A process according to claim 1, wherein the reacting comprises heating the aluminum-filled green body to a temperature above 1000° C. to form the ceramic-metal composite.

10. A process according to claim 1, wherein the liquid aluminum is pressed into the green body at a filling temperature below 900° C.

11. A process according to claim 1, further comprising pressing the liquid aluminum into the green body by a pressure casting process.

12. A process according to claim 1, wherein:
   the filling comprises heating aluminum powder to a temperature above 1000° C. and melting the aluminum to form a liquid which infiltrates into the pores of the green body, and
   the reacting comprises reacting the liquid aluminum and the reaction product during the absorption based on a reaction infiltration to form the ceramic-metal composite.

13. A process according to claim 1, wherein the producing of the porous green body comprises:
   dry mixing the reaction product;
   adding a binder to the reaction product;
   wet mixing the binder and the reaction product;
   drying the binder and the reaction product; and
   comminuting and pressing the binder and the reaction product, thereby obtaining the porous green body in powder form.

14. A process according to claim 13, wherein the binder promotes the reaction between aluminum and the reaction product.

15. A process according to claim 5, wherein the producing of the porous green body comprises:
   dry mixing the reaction product;
   adding a binder to the reaction product;
   wet mixing the binder and the reaction product;
   drying the binder and the reaction product; and
   comminuting and pressing the binder and the reaction product, thereby obtaining the porous green body in powder form.

16. A process according to claim 13, further comprising dissolving the binder in a solvent, wherein the binder is selected from the group consisting of polypropylene carbonate, sodium hydrogen silicate, ethyl silicate and polyvinyl alcohol.

17. A process according to claim 16, wherein said solvent is an organic solvent.

18. A process according to claim 17, wherein said solvent is acetone.

19. A process according to claim 1, further comprising adding at least one of $TiB_x$, $TiC_y$, or TiCN to the green body mix, wherein $0<x<2$ and $0<y<1$.

20. A process according to claim 1, further comprising, prior to the said producing the porous green body, adding fibers to the green body mix.

21. A process according to claim 20, wherein said fibers have a length of less than 15 mm.

22. A process according to claim 20, wherein said fibers have a length of less than 3 mm.

23. A process according to claim 20, wherein said fibers comprise a felt or a woven fabric.

24. A process according to claim 20, wherein the fibers comprise a material selected from the group consisting of $Al_2O_3$, SiC, metal, and minerals.

25. A process according to claim 20, wherein the fibers comprise steel.

26. A process according to claim 1, further comprising adding liquid magnesium to said liquid aluminum.

* * * * *